Patented Apr. 26, 1927.

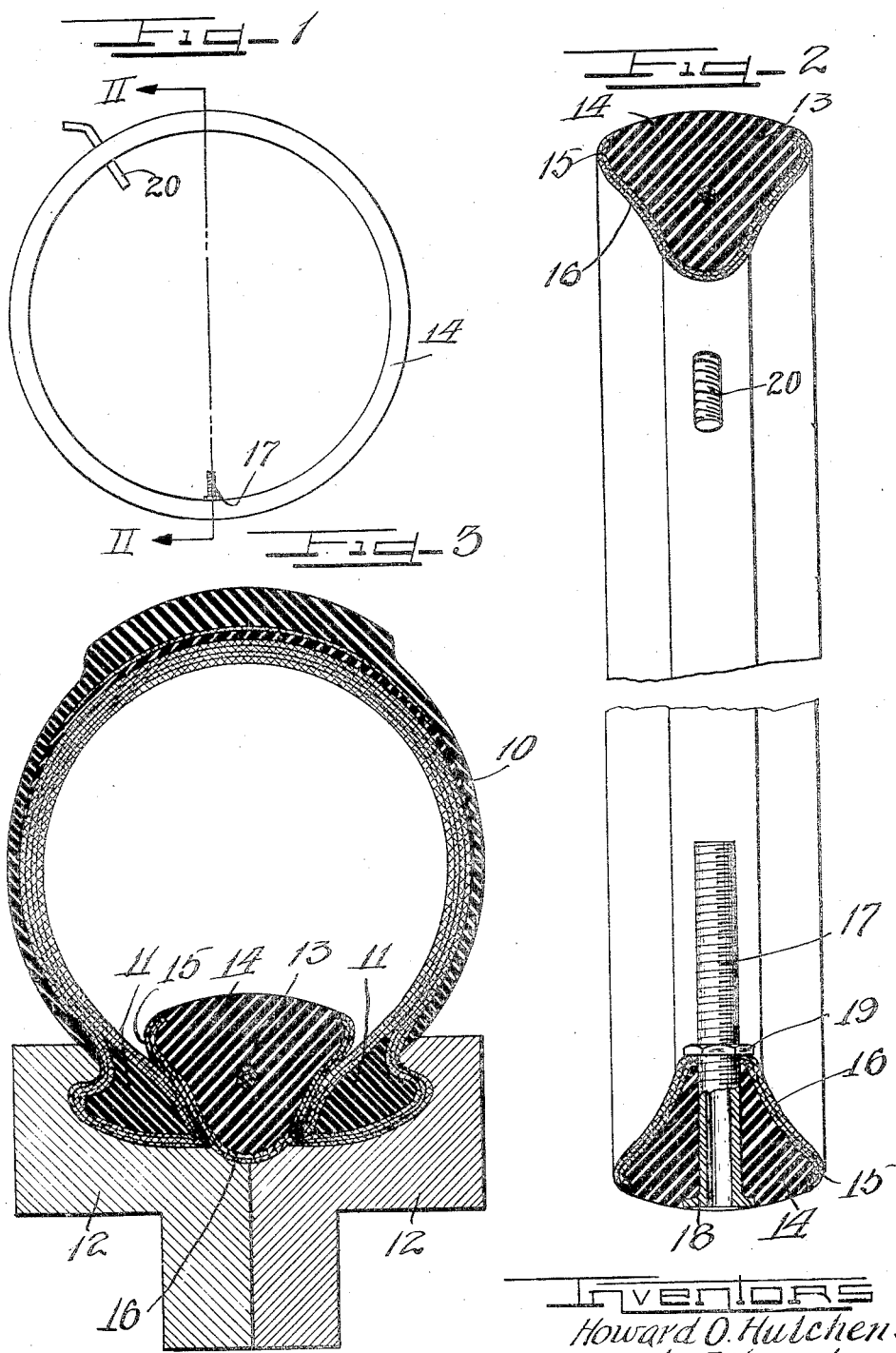

1,625,894

UNITED STATES PATENT OFFICE.

HOWARD O. HUTCHENS AND CHARLES A. KESSLER, OF EAU CLAIRE, WISCONSIN, ASSIGNORS TO GILLETTE RUBBER CO., OF EAU CLAIRE, WISCONSIN, A CORPORATION OF WISCONSIN.

FLEXIBLE GASKET FOR TIRE MOLDS.

Application filed December 14, 1925. Serial No. 75,158.

This invention relates to a flexible gasket for sealing the beads of pneumatic tires in the molds during the vulcanizing operation.

It is an object of this invention to provide a gasket for sealing the space between the beads of a pneumatic tire during vulcanizing in order to permit the introduction of a vulcanizing fluid under pressure directly in contact with the inner walls of the tire in order to eliminate the air bags customarily used in producing the required internal pressure, and to greatly reduce the vulcanizing time by applying the vulcanizing heat to the interior of the tire thereby vulcanizing the tire carcass from both surfaces simultaneously.

It is also an object of this invention to provide a flexible curing ring doing away with the usual air bag or metal core while sealing the space between the bead rings of the tire to permit the application of fluid pressure directly to the inner surface of the tire. To accomplish this result the ring is built up of the proper dimensions to force the bead rings into the desired shape and thereby forming the gasket between the curing ring and the bead rings.

Other and further important objects of this invention will be apparent from the disclosures in the specification and the accompanying drawings.

This invention (in the preferred form) is illustrated in the drawings and hereinafter more fully described.

On the drawings:

Figure 1 is a side elevation on a greatly reduced scale of a gasket embodying the features of this invention.

Figure 2 is a cross section on the line II—II of Figure 1 to a scale more nearly actual size.

Figure 3 is a cross section of a pneumatic tire with part of the vulcanizing mold applied thereto, with the gasket of this invention in position.

As shown on the drawings:

A cross section of a tire carcass 10 is shown in Figure 3 wherein the tire beads 11 are shown fitting into suitable grooves in mold rings 12 forming part of the vulcanizing mold proper, which has been omitted from the drawings because of its well known commercial form which has no bearing on the present invention. The toes of the tire beads are somewhat spaced apart in the mold rings and the space therebetween is occupied by the gasket of this invention.

This gasket is built up around a cable 13 of braided wire or other stiffening ring, resembling the cable bead fillers used in straight side tires to prevent stretching of the beads, the surrounding material 14 being preferably a tough but resilient grade of rubber of a composition having a vulcanizing temperature higher than that intended to be used in the vulcanization of the tire carcass 10, in order that the gasket may not become over-vulcanized by repeated use in the vulcanization of tires.

If a horizontal line be drawn through the cable 13, that portion of the gasket below the line has an outline conforming to the desired outline of the inner surfaces of the tire beads and extending slightly into the mold rings below the extreme tip of the toe of the beads to give the desired point thereto. Above the reference line referred to the sides of the gasket in contact with the inner surface of the tire are rounded off as at 15 to form a gradual smooth break with the side walls in order to prevent the formation of a sharp ridge thereon due to the pressure of the gasket. The surfaces of the gasket in contact with the mold and tire beads as well as the rounded corners 15 are covered with one or more strips of fabric 16 vulcanized thereto.

At one point in the gasket a tube 17 is inserted radially therethrough and clamped thereto by the tube shoulder 18 and nut 19. This tube permits the introduction of a fluid vulcanizing agent into the interior of the tire after assembly of the mold. A similar tube 20 extends to a point near the lowest part of the tire to act as a drain or blow-off for condensate, as well as to maintain circulation through the carcass.

We are aware that many changes may be made, and numerous details of construction may be varied through a wide range without departing from the principles of this invention, and we therefore do not purpose limiting the patent granted hereon, otherwise than necessitated by the prior art.

We claim as our invention:

1. A sealing ring adapted to seal the space between the toes of the beads of a pneumatic tire during the vulcanizing process, comprising a flexible fabric covered rubber core having a central stiffening cable embedded therein, the ring being of substantially triangular cross-section with the upper corners rounded to avoid the formation of a ridge on the side walls of the tire.

2. A sealing ring for tire vulcanizing comprising a central stiffening cable, a rubber core surrounding said cable and of substantially triangular cross-section with rounded corners, and a fabric covering for said core.

In testimony whereof we have hereunto subscribed our names.

HOWARD O. HUTCHENS.
CHAS. A. KESSLER.